US008304747B2

(12) United States Patent
Kavassalis et al.

(10) Patent No.: US 8,304,747 B2
(45) Date of Patent: Nov. 6, 2012

(54) SENSORS AND METHODS FOR DETERMINING WHETHER AN ITEM HAS BEEN EXPOSED TO AN ENVIRONMENTAL CONDITION

(75) Inventors: Tom Kavassalis, Oakville (CA); Peter M. Kazmaier, Mississauga (CA); Gabriel Iftime, Mississauga (CA); Kentaro Morimitsu, Mississauga (CA); Adela Goredema, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 625 days.

(21) Appl. No.: 12/557,130

(22) Filed: Sep. 10, 2009

(65) Prior Publication Data

US 2011/0056282 A1  Mar. 10, 2011

(51) Int. Cl.
*G01J 1/38* (2006.01)
(52) U.S. Cl. .................................. 250/474.1
(58) Field of Classification Search .................. 250/372, 250/473.1, 474.1
See application file for complete search history.

(56) References Cited

U.S. PATENT DOCUMENTS

| 5,387,798 | A  | * | 2/1995  | Funakoshi et al. | 250/474.1 |
| 6,046,455 | A  | * | 4/2000  | Ribi et al.      | 250/372   |
| 6,405,867 | B1 | * | 6/2002  | Moore            | 206/459.1 |
| 6,437,346 | B1 |   | 8/2002  | Goudjil          |           |
| 6,465,791 | B1 |   | 10/2002 | Ribi et al.      |           |
| 6,567,158 | B1 | * | 5/2003  | Falciai et al.   | 356/51    |
| 7,589,331 | B2 | * | 9/2009  | Havens et al.    | 250/474.1 |
| 7,645,560 | B1 | * | 1/2010  | Iftime et al.    | 430/270.1 |
| 7,667,285 | B2 | * | 2/2010  | Wielgus et al.   | 257/435   |
| 2003/0008409 | A1 | * | 1/2003 | Spearman et al. | 436/169 |
| 2008/0311489 | A1 |   | 12/2008 | Kazmaier et al. |         |
| 2008/0311490 | A1 |   | 12/2008 | Norsten et al.  |         |
| 2008/0311491 | A1 |   | 12/2008 | Iftime et al.   |         |
| 2008/0311493 | A1 |   | 12/2008 | Norsten et al.  |         |
| 2008/0311494 | A1 |   | 12/2008 | Norsten et al.  |         |
| 2008/0311495 | A1 |   | 12/2008 | Norsten et al.  |         |
| 2008/0311517 | A1 |   | 12/2008 | Iftime et al.   |         |
| 2008/0311518 | A1 |   | 12/2008 | Iftime et al.   |         |
| 2008/0311519 | A1 |   | 12/2008 | Kazmaier et al. |         |
| 2008/0311521 | A1 |   | 12/2008 | Kazmaier et al. |         |

FOREIGN PATENT DOCUMENTS

WO   WO 2007/082137 A1   7/2007

OTHER PUBLICATIONS

U.S. Appl. No. 12/206,136, filed Sep. 8, 2008, to Morimitsu et al.
Shirai et al., "Photoacid and Photobase Generators: Chemistry and Applications to Polymeric Materials," Prog. Polym. Sci., vol. 21, pp. 1-45, 1996.
Office Action issued in Canadian Patent Application No. 2,714,321, mailed Apr. 18, 2012.

* cited by examiner

*Primary Examiner* — Freddie Kirkland, III
(74) *Attorney, Agent, or Firm* — Oliff & Berridge, PLC

(57) ABSTRACT

A method for determining whether an item has been exposed to an environmental condition during a monitoring period. The method includes placing a sensor at least in proximity to the item at the beginning of the monitoring period so that the sensor will be exposed to a level of an environmental condition that can be correlated to an exposure level of the item to the environmental condition; reading the sensor; and determining from reading the sensor whether the item has been exposed to the environmental condition. The sensor includes a detecting material comprising a photochromic or photothermochromic material, the detecting material selected so that upon exposure to the environmental condition the detecting material exhibits a detectable color change.

15 Claims, No Drawings

SENSORS AND METHODS FOR DETERMINING WHETHER AN ITEM HAS BEEN EXPOSED TO AN ENVIRONMENTAL CONDITION

TECHNICAL FIELD

This disclosure is generally directed to sensors and methods for determining exposure of an item to one or more environmental conditions, such as exposure to heat, UV light, and visible light. This disclosure also relates to methods of making and using such sensors.

BACKGROUND

Printable sensors have been described as part of the printed organic electronics market and for screen printing on glass or plastic for windows, such as those described in WO 2007/082137. For example, it is possible to attach accelerometers to expensive equipment that is shock sensitive. However, there exists a need for a low-cost simple sensor for detecting exposure to various temperatures, UV light, and visible light.

For some materials such as medicines or foodstuffs, it is difficult for the druggist, the supermarket, or the consumer to know what conditions an item has been subjected to from the initial packaging to receipt and/or purchase of the item.

Currently, many labels contain a "best before date" to inform a retailer or consumer of the condition of an item. However, the expiration date often depends on the actual exposure history of the goods to environmental conditions, including temperature, light, or ultraviolet light to which the item has been exposed.

SUMMARY

The present disclosure in embodiments addresses these various needs by providing a sensor comprising a detecting material that includes a photochromic or a photothermochromic compound. Such sensors may be used to track the exposure of articles to environmental conditions.

The sensors of the present disclosure may be tailored and selected to determine whether an item has been exposed to one or more environmental conditions. For example, the sensors may be configured to track exposure to visible light, heat, and/or ultraviolet light. For items that degrade or that are less effective when exposed to certain environmental conditions, the rate of response of the sensor to the environmental condition may be adjusted to match the degradation of the article or product being tracked. Thus, the sensors effectively and more accurately indicate the actual condition of an item to a recipient, user, retailer, or consumer.

These and other improvements are accomplished by the sensors and methods described in embodiments herein.

In embodiments, sensors for determining whether an item has been exposed to an environmental condition comprise a detecting material. A photochromic or photothermochromic material is included in the detecting material. The detecting material is configured so that when it is exposed to at least one environmental condition, such as a threshold temperature, visible light, and/or ultraviolet light, it creates a detectable change in the detecting material.

Embodiments also include methods for using such sensors, including placing a sensor in proximity to the item at the beginning of a time period so that the sensor will be exposed to a level of an environmental condition that can be correlated to an exposure level of the item to the environmental condition; reading the sensor; and determining from reading the sensor whether the item has been exposed to a particular environmental condition. Embodiments also include methods for making such sensors.

EMBODIMENTS

The detecting material used in embodiments of the sensor comprise at least one compound that exhibits photochromism or thermochromism. Photochromism and thermochromism are defined as the reversible coloration of a molecule from exposure to light (electromagnetic radiation) and heat (thermal radiation) based stimuli, respectively. Typically, photochromic molecules undergo structural and/or electronic rearrangements when irradiated with light or exposed to heat that converts them to a more conjugated colored state or a less conjugated colorless state.

In the case of purely photochromic molecules, the colored state can typically be converted back to their original colorless state by irradiating them with visible light. Dithienylethenes and filgides are examples of such photochromic molecules that generally exhibit thermal bi-stability.

In the case of photothermochromic molecules, isomerization may occur by irradiation and by applying heat. Spiropyrans, azabenzenes, schiff bases, and the like are examples of molecules classified as both thermochromic and photochromic.

Photochromic compounds are typically bi-stable in absence of light whereas photothermochromic compounds will transform in the absence of light through a thermal process to the thermodynamically more stable state.

In some embodiments, photochromic and photothermochromic compounds may be employed to create a sensor for detecting the exposure history of an item to visible light, UV light, heat, a threshold temperature, or a combination thereof.

"Threshold temperature" means a predetermined maximum temperature that the temperature of the item should not exceed.

Exemplary photochromic and/or photothermochromic materials that may be used in various embodiments include spiropyrans and related compounds like spirooxazines and thiospiropyrans, benzo and naphthopyrans (chromenes), stilbene, azobenzenes, bisimidazols, spirodihydroindolizines, quinines, perimidinespirocyclohexadienones, viologens, fulgides, fulgimides, diarylethenes, hydrazines, anils, aryl disulfides, aryl thiosulfonates, and the like.

For example, the following compounds may be used:

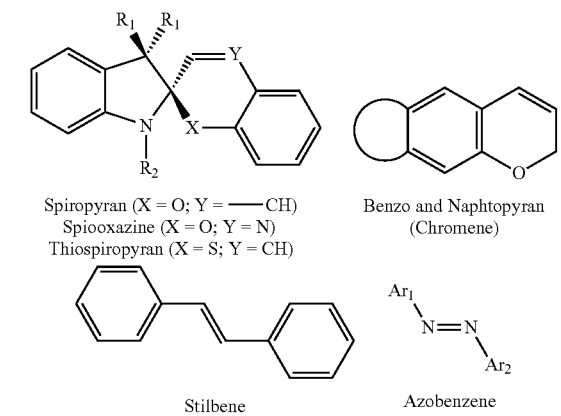

Spiropyran (X = O; Y = ―CH)
Spiooxazine (X = O; Y = N)
Thiospiropyran (X = S; Y = CH)

Benzo and Naphtopyran (Chromene)

Stilbene

Azobenzene

-continued

Bisimidazol

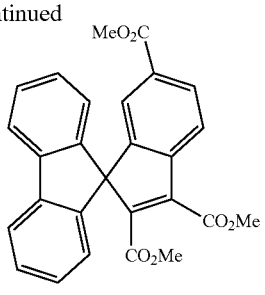
Spirodihydroindolizines

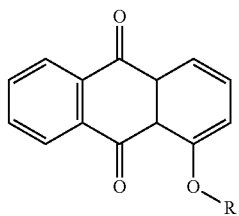
Quinone

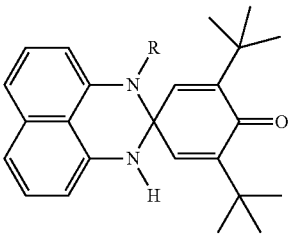
Perimidinespirocyclohexadiennones

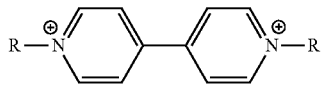
Viologen

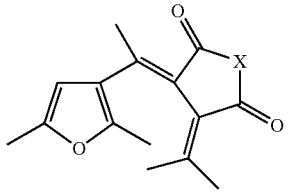
Fulgides (X = O)
Fulgimides (X = NR)

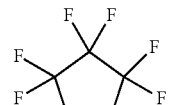
Diarylethenes

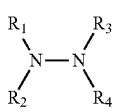
Hydrazines

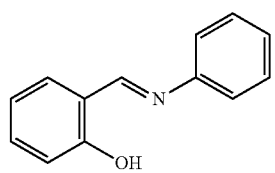
Anil

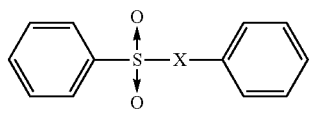
Aryl thiosulfonates

In these structures, the various R groups (i.e., R, $R_1$, $R_2$, $R_3$, $R_4$) can independently be any suitable group including, but not limited to, hydrogen; alkyl, such as methyl, ethyl, propyl, butyl, and the like, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, where for each of the foregoing, the alkyl group has from 1 to about 50 or more carbon atoms, such as from 1 to about 30 carbon atoms; aryl, including phenyl, naphthyl, phenanthrene, anthracene, substituted groups thereof, and the like, and having from about 6 to about 30 carbon atoms, such as from about 6 to about 20 carbon atoms; arylalkyls having from about 7 to about 50 carbon atoms, such as from about 7 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups, such as those having from 1 to about 50 carbon atoms, such as from 1 to about 30 carbon atoms; aryloxy groups, such as those having from about 6 to about 30 carbon atoms, such as from about 6 to about 20 carbon atoms; alkylthio groups, such as those having from 1 to about 50 carbon atoms, such as from 1 to about 30 carbon atoms; arylthio groups, such as those having from about 6 to about 30 carbon atoms, such as from about 6 to about 20 carbon atoms; aldehyde groups; ketone groups; ester groups; amide groups; carboxylic acid groups; sulfonic acid groups; and the like. The alkyl, aryl, and arylalkyl groups may also be substituted with groups such as, for example, silyl groups; nitro groups; cyano groups; halide atoms, such as fluoride chloride, bromide, iodide, and astatide; amine groups, including primary, secondary, and tertiary amines; hydroxy groups; alkoxy groups, such as those having from 1 to about 20 carbon atoms, such as from 1 to about 10 carbon atoms; aryloxy groups, such as those having from about 6 to about 20 carbon atoms, such as from about 6 to about 10 carbon atoms; alkylthio groups, such as those having from 1 to about 20 carbon atoms, such as from 1 to about 10 carbon atoms; arylthio groups, such as those having from about 6 to about 20 carbon atoms, such as from about 6 to about 10 carbon atoms; aldehyde groups; ketone groups; ester groups; amide groups; carboxylic acid groups; sulfonic acid groups; and the like. $Ar_1$ and $Ar_2$ can independently be any suitable aryl or aryl-containing group including, but not limited to, phenyl, naphthyl, phenanthrene, anthracene, and the like, and substituted groups thereof including any of the substitutions mentioned above for the alkyl, aryl, and arylalkyl groups. X in the spiropyran formula is a suitable heteroatom such as N, O, S, and the like. Y can be $-N-$ or $-CH-$. $X^-$ in the Viologen formula can be, for example, $F^-$, $Cl^-$, $Br^-$, $I^-$, $BF_4^-$, $PF_6^-$, $B(C_6H_5)_4^-$, and the like. $X^-$ in the aryl thiosulfonate can be, for example, $-O-$, S, $-NH-$ and the like.

The photochromes and photothermochromes may be used alone, or they may also be used in combination with various other additives and substances, such as those disclosed in U.S. patent application Ser. No. 12/206,136 and U.S. Patent Application Publication Nos. 2008-0311489-A1, 2008-0311490-A1, 2008-0311491-A1, 2008-0311519-A1, 2008-0311493-A1, 2008-0311494-A1, 2008-0311495-A1, and 2008-0311521-A1 of which the entire disclosures are incorporated herein by reference. For example, ionomers, stabilizers, polymers, solvents, and infrared absorbers may be added as described in the above disclosures to stabilize colored or colorless isomers, to tune the sensors to a desired environmental condition, or to impart other desirable properties to the sensor. For example, these compounds may be added to slow down, stop, or accelerate the isomerization switch of a photochromic or photothermochromic material from, for example, a colored to a colorless state, or from a colorless state to a colored state, that results from exposure of the sensor to an environmental condition.

In addition to the above photochromes and photothermochromes, photobase generators and photoacid generators may also be used in embodiments either separately or in combination with various photobase and photoacid generators and with the above photochromes.

Any suitable photobase generator can be used, where the photobase generator is a precursor that generates a base, such as an amine, when exposed to the activating energy such as UV light. In embodiments, the photobase generator produces an amine when exposed to UV light, where the amine is a basic compound having a pH>7.

Exemplary photobase generators are known in the art, and may be used in various embodiments herein. Exemplary photobase generators include o-acyloximes, benzoyloxycarbonyl derivatives, photoactive carbamates such as benzyl carbamates and benzoin carbamates, oxime ester compounds like o-carbamoyloximes, ammonium compounds like quaternary ammonium tetraphenyl borate salts, benzoin compounds, dimethoxybenzyl urethane compounds, orthonitrobenzyl urethane compounds, aromatic sulfonamides, alpha-lactams, N-(2-arylethenyl) amides, mixtures thereof, and the like. These compounds generally generate amines as bases by being irradiated with an active energy beam such as UV light. However, photobase generators that generate ammonia or hydroxy ions due to the action of light may also be used. These can be selected from, for example, N-substituted 4-(o-nitrophenyl)dihydroxypyridines, N-(2-nitrobenzyloxycarbonyl)piperidine, 1,3-bis(N-(2-nitrobenzyloxycarbonyl)-4-piperidyl]propane, N,N'-bis(2-nitrobenzyloxycarbonyl)dihexylamine, and O-benzylcarbonyl-N-(1-phenylethylidene)hydroxylamine.

Exemplary photoacid generators may be used, where the photoacid generator is a precursor that generates an acid, which can be an organic or an inorganic acid, when exposed to the activating energy such as UV light. In embodiments, the photoacid generator produces an acid when exposed to UV light, where the acid has a pH<7.

Exemplary photoacid generators are known in the art, and may be used in various embodiments herein. Exemplary photoacid generators include halogenated triazines, onium salts such as aryldiazonium salts and diaryl halonium salts, triaryl sulfonic salts, sulfonated esters, substituted hydroxyimides, substituted hydroxylimines, azides, naphthoquinones such as diazonaphthoquinones, diazo compounds, and combinations thereof. Another class of photoacid generator materials is represented by non-ionic photoacid generators, such as nitrobenzyl esters, sulfones, phosphates, and the like. These compounds generally generate an acid by being irradiated with an active energy beam such as UV light.

A further review of photoacid and photobase generators can be found, for example, in Prog. Polym. Sci. vol. 21, 1-45, 1996, the entire disclosure of which is incorporated herein by reference.

The photobase and photoacid generators may be combined with acid/base indicators or coupling agents to produce or erase a visible image. Photobase and photoacid generators used as sensor materials may provide a permanent image upon exposure to a stimulus. Such a permanent image may be advantageous because it cannot be easily tampered with or reversed, and can be readily observed without fear of erasure by exposure to, for example, UV light, which can reverse the colored state of some photochromic materials.

Exemplary acid-base indicators may also be used, where the acid-base indicator reacts with the acid generated from the photoacid generator to produce a colored image. In some embodiments, the reaction of the acid-base indicator with the acid generated from the photoacid generator causes the sensor to change from a clear or colorless state to a colored state, or from a first colored state to a second, different colored state, with the degree and/or color of the change being related to the type of materials reacting and the relative amount of material reacting.

Exemplary acid-base indicators are known in the art, and are generally readily available, being used in analytical labs worldwide for acid-base titrations. In general, any acid-base indicator that produces a significant enough color change when switching between the protonated and deprotonated states is suitable. Exemplary acid-base indicators may be found in U.S. Patent Application Publication Nos. 2008-0311517-A1 and 2008-0311518-A1 of which the entire disclosures are incorporated herein by reference.

A suitable coupling agent may also be used, where the coupling agent reacts with the base generated from the photobase generator to produce an extended conjugation to produce a colored image, and/or an extended conjugation can in turn react with an acid generated from the photoacid generator to reverse the reaction to form a colorless image, thus erasing the colored image.

In some embodiments, the reaction of the coupling agent with the base generated from the photobase generator causes the image forming layer at the reaction site to change from a clear or colorless state to a colored state, with the degree and/or color of the change being related to the type of materials reacting and the relative amount of material reacting. Likewise, the reaction of an extended conjugation with the acid generated from the photoacid generator causes the image forming layer at the reaction site to change from a colored state to a clear or colorless state, with the degree and/or color of the change being related to the type of materials reacting and the relative amount of material reacting.

Exemplary coupling agents are known in the art. For example, suitable coupling agents are those that may react with the colorless base generated from the photobase generator to form a colored extended conjugation or Schiff base compound, and where the resultant extended conjugation or Schiff base compound can in turn react with an acid generated from the photoacid generator to reverse the reaction to form a colorless image thereby erasing the colored image.

It will be appreciated that with the suitable selection of acid-base indicators and/or coupling agents, it is possible to produce any color on the sensor. For example, suitable acid-base indicators and coupling agents can be selected to provide colors ranging from yellow, to red, to blue, to purple. Furthermore, combinations of two or more indicators or coupling agents may be used to provide a wider range of colors. For example, black or full color images can be provided by selecting combinations of acid-base indicators and/or coupling agents to form cyan, magenta, and yellow colors.

In addition, a suitable photosensitizer may optionally be used in combination with the photobase and/or photoacid generator to expand the photosensitize wavelength band of the active energy beam of the photobase or photoacid generator. Various photosensitizers are well known in the art. Examples of the photosensitizers include benzophenone, and the like. However, in some embodiments, a photosensitizer is desirably omitted, to provide a narrow wavelength band of the active energy beam to help prevent accidental activation of the imaging materials.

To track or monitor the exposure history of an item to a certain environmental condition, the sensor should be placed at least in proximity to the item being monitored. "At least in proximity" means that the sensor is placed in a position such that the sensor will be exposed to a level of the environmental condition sufficient to create a detectable change in the detecting material that can be correlated to an exposure level of the item to the environmental condition. This includes locations such as on the item, in the item, and locations not on or in the item. In other words, a sensor may need not be placed directly on the item for it to be useful in tracking exposure to an environmental condition. For example, one sensor may be used to track the conditions of multiple items. Suitable locations for the sensor may vary depending on the item and the environmental conditions being monitored.

"Detectable change" means any color change exhibited by the detecting material that can be detected. Such a change may include, for example, a visible color change and/or a change in light absorption or reflection as read by various machines designed to read color changes that may or may not be visible to the naked eye.

In some embodiments, the sensor may be applied directly to the item or embedded in the item. In some embodiments, the sensor is in the form of an ink that is printed directly onto the surface of the item to be monitored, or to a container holding the item.

In other embodiments, the sensor is in the form of an ink that is printed on a substrate that is adhered to the item or a container holding the item, or is included with the item or within the container of the item, or the packaging containing the item or the container. In an embodiment, the sensor is part of a shipping label or a product label.

In other embodiments, the sensor is the item. For example, a sensor could be shipped to a location to test or monitor the conditions of a shipping route. Similarly, a sensor could be placed at a location to monitor the environmental conditions of the location over a period of time.

As described above, the sensor may be in the form of an ink or another substance that can be printed or applied directly to an item or a substrate. However, the sensor may also take the form of encapsulated liquids, solid particles, polymer films, adhesive tape, and various other forms suitable for monitoring the exposure of an item to environmental conditions. The size and shape of the sensor are not particularly limited, so long as there is sufficient detecting material that can exhibit a detectable change upon exposure to the environmental condition.

In embodiments where the sensor comprises a substrate, the substrate may be coated or impregnated on at least one side with a detecting material comprising one or more photochromic and/or photothermochromic compounds and any additional materials as described above. As desired, the substrate can be coated or impregnated on only one side, or on both sides, with the detecting material. When the detecting material is coated or impregnated on both sides of the substrate, or when higher visibility of the color change in the detecting material is desired, an opaque layer may be included between the supporting substrate and the detecting material or on the opposite side of the supporting substrate from the coated detecting material.

Any suitable supporting substrate may be used. For example, suitable examples of supporting substrates include, but are not limited to, glass, ceramics, wood, plastics, paper, fabrics, textile products, polymeric films, inorganic substrates such as metals, and the like. The plastic may be for example a plastic film, such as polyethylene film, polyethylene terephthalate, polyethylene naphthalate, polystyrene, polycarbonate, and polyethersulfone. The paper may be, for example, plain paper such as XEROX® 4024 paper, ruled notebook paper, bond paper, silica coated papers such as Sharp Company silica coated paper, Jujo paper, and the like.

The substrate may be a single layer or multi-layer where each layer is the same or different material. In some embodiments, the substrate has a thickness ranging, for example, from about 0.3 mm to about 5 mm, although smaller or greater thicknesses can be used, if desired, When an opaque layer is used in the sensor, any suitable material may be used. For example, where a white paper-like appearance is desired, the opaque layer may be formed from a thin coating of titanium dioxide, or another suitable material like zinc oxide, inorganic carbonates, and the like. The opaque layer can have a thickness of, for example, from about 0.01 mm to about 10 mm, such as from about 0.1 mm to about 5 mm, although other thicknesses can be used.

If desired, an overcoating layer may be applied over the detecting material. The further overcoating layer may also be applied to further adhere the underlying layer in place over the substrate, to provide wear resistance, to improve appearance and feel, and the like. The overcoating layer can be the same as or different from the substrate material, although in embodiments at least one of the overcoating layer and substrate layer is clear and transparent to permit visualization of a color change. The overcoating layer can have a thickness of; for example, from about 0.01 mm to about 10 mm, such as about 0.1 mm to about 5 mm, although other thicknesses can be used.

Sensors may be configured based on the desired environmental condition to be detected. This condition may be a predetermined threshold level of an environmental condition. The sensor may be configured to indicate exposure to an environmental condition by using a detecting material that changes from a colorless to a colored state upon exposure to the environmental condition. For example, upon exposure to an environmental condition, a preprinted colorless ink changes from its colorless state to a colored state and displays the preprinted text, symbol, or message. For example, the text may state, "Exposed to UV light, Do not use!"

Alternatively, the sensor can be configured to indicate exposure to an environmental condition by using a material that changes from a colored state to a colorless state. For example, a preprinted visible message, such as "Safe to Use" may be included on or with the item. Upon exposure to an environmental condition, the message disappears. In such a case, the sensor or item may include a permanently written message directing the user to look for the "Safe to Use" message prior to use. In addition, a combination of appearing and/or disappearing messages may be employed to sense multiple environmental conditions or the length of exposure to a condition.

In some embodiments, sensors may also be tuned to desired specifications. Thus, threshold condition may be determined and monitored. For example, an item may be safe to use as long as it is not heated above $X°$ C. A sensor may thus be designed to indicate heating above $X°$ C. For example, a sensor photochrome incorporated into a polymer matrix may have a large volume of activation for the coloration reaction. At low temperature in the presence of UV light, it will not readily ring open to the colored form. In contrast, if the polymer is (1) heated above the glass transition temperature (Tg) of the polymer—the temperature at which the polymer chains become mobile—and (2) the photochrome is irradiated with UV light, then the photochrome ring will open since the mobile polymer chains no longer hinder the reaction. Thus, a sensor of this type reacts simultaneously to heat and UV light, since each of these inputs alone is not able to trigger the sensor response.

In other embodiments, the sensor may be tuned or configured to track environmental conditions over a specific period of time. For example, a sensor may be tuned to monitor an item from the time the item is packaged, during shipping, and to a time when the package is opened. Also, the sensor may be tuned to mark the single occurrence of a particular condition, multiple occurrences of a particular condition, a single occurrence of various conditions, or multiple occurrences of various conditions. For example, if a chiral spiropyran that was optically active and rotated plane polarized light was used as a sensor, then exposure of the sample to UV light would lead to the colored state. If this sample were later exposed to a second input (heat), then the heat would revert the spiropyran to the colorless state. However the colorless state would be racemic (a mixture of enantiomers) and, thus, it would no longer be optically active and no longer rotate plane polarized light. Thus, such a sensor probes both UV light and heat exposure.

oration as the acid is generated photochemically. Since the optical absorption, by the Beer-Lambert Law, is related to the amount of indicator that is activated by the acid, one can use the optical absorption as a dosage indicator because it would correlate to the degree of UV light exposure.

Moreover, R groups, in particular $NO_2$ groups, can be adjusted and changed to effect both the kinetics of ring opening and the stability of the two states (ring open vs. ring closed) can be changed by changing various functional groups.

Table 1, shown below, provides examples of inputs, materials, the initial state, and the detections state for various exemplary photochromic and photothermochromic materials.

TABLE 1

| | Input | Material Class | Initial State | Detection State |
|---|---|---|---|---|
| 1 | Heat (integrated over time) | Spiropyrans | Colored | Colorless |
| 2 | Heat (integrated over time) | Spiroxazines | Colored | Colorless |
| 3 | Heat threshold (greater than 140° C.) | Thermochromics | Colored | Colorless |
| 4 | UV light | Spiropyrans | a. Colorless b. writing on white background | a. Colored b. background colors appear and obscure writing |
| 5 | UV light | DTEs | a. Colorless b. writing on white background | a. Colored b. background colors appear and obscure writing |
| 6 | UV light | Fulgides | a. Colorless b. writing on white background | a. Colored b. background colors appear and obscure writing |
| 7 | UV light | Photobase generator | a. Colorless b. writing on white background | a. Colored b. background colors appear and obscure writing |
| 8 | UV light | Photoacid generator | a. Colorless b. writing on white background | a. Colored b. background colors appear and obscure writing |
| 9 | Visible light | DTEs | Colored | Colorless |
| 10 | Visible light | Fulgides | Colored | Colorless |
| 11 | Combination of Heat and UV light (−20° C. to 80° C.) | Polymeric spiropyrans tuned by polymer Tg | a. Colorless b. writing on white background | a. Colored b. background colors appear and obscure writing |
| 12 | Combination of Heat and Visible light (greater than 100° C.) | Alkoxy DTEs | Colored | Colorless |

A sensor may also be configured to track the degree of exposure to an environmental condition. For example, a sensor may be tuned to exhibit a color change that intensifies or diminishes in response to exposure to the environmental condition. Increased amounts of exposure to the environmental condition will result in an increasing degree of color change in the detecting material. Thus, the change in color intensity can be determined and then correlated to the degree of exposure to the environmental condition. A color key, for example, may be provided to help determine the extent of exposure. For example, the combination of a photoacid generator in conjunction with an acid-base indicator dye will trigger the col-

EXAMPLES

Example 1

An exemplary spiropyran/merocyanine, shown below, was prepared. The material maintained its colored state at 0° C. almost indefinitely. However, at 80° C., the colored state shifted to the colorless state in a matter of seconds.

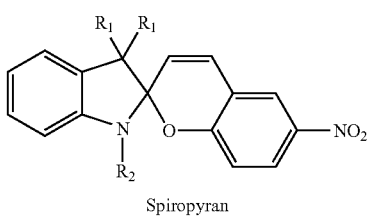

Spiropyran

Example 2

An exemplary spiroxizane, shown below, was prepared. The material maintained its colored state at −20° C. However, at room temperature, the colored state shifted to the colorless state in a matter of seconds.

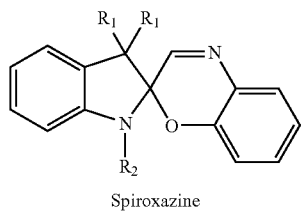

Spiroxazine

Example 3

An exemplary material, shown below, was prepared. The material maintained its colored state at room temperature and under ambient office light for weeks. However, at 120-140° C., the colored state shifted to the colorless state in a matter of seconds.

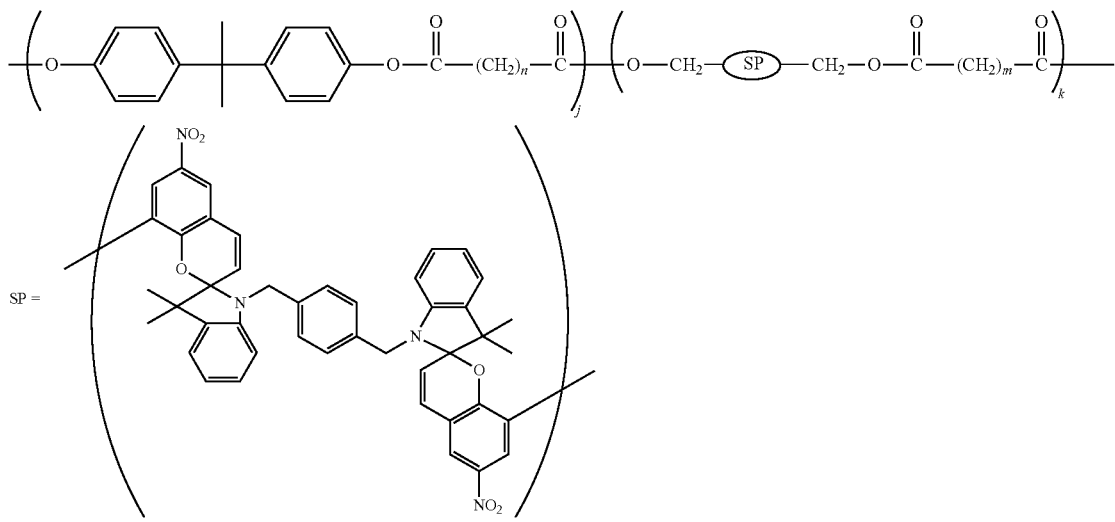

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method for determining whether an item has been exposed to an environmental condition during a monitoring period, the method comprising:
    placing a sensor at least in proximity to the item at the beginning of the monitoring period so that the sensor will be exposed to a level of an environmental condition that can be correlated to an exposure level of the item to the environmental condition;
    reading the sensor; and
    determining from reading the sensor whether the item has been exposed to the environmental condition;
    wherein:
        the sensor comprises a detecting material comprising a photochromic or photothermochromic material, the detecting material selected so that upon exposure to the environmental condition the detecting material exhibits a detectable color change, and
        a rate of response of the sensor to the environmental condition is adjusted to match a degradation rate of the item.

2. The method of claim 1, wherein the environmental condition is selected from the group consisting of ultraviolet light, visible light, and a threshold temperature.

3. The method of claim 1, wherein the detectable color change is a change from a colorless state to a colored state, a change from a colored state to a colorless state, a change from one colored state to a different colored state, or a change in color intensity.

4. The method of claim 1, wherein the sensor is a label.

5. The method of claim 1, wherein the sensor is affixed to the item, printed on the item, or embedded in the item.

6. The method of claim 1, wherein the sensor further comprises a substrate.

7. The method of claim 1, wherein the detecting material further comprises a photoacid generator or photobase generator in conjunction with an acid-base indicator.

8. The method of claim 6, wherein the substrate is selected from the group consisting of glass, ceramic, wood, plastic, paper, fabric, textile, metals, plain paper, and coated paper.

9. The method of claim 1, wherein the item is the sensor.

10. A sensor, comprising:

a detecting material comprising a photochromic or photothermochromic material, the detecting material selected so that upon exposure to an environmental condition the detecting material exhibits a detectable color change, wherein a rate of response of the sensor to the environmental condition is adjusted to match a degradation rate of an item being tracked.

11. The sensor of claim 10, wherein the environmental condition is selected from the group consisting of ultraviolet light, visible light, and a threshold temperature.

12. The sensor of claim 10, wherein the sensor is a label.

13. The sensor of claim 10, wherein the sensor further comprises a substrate.

14. The sensor of claim 13, wherein the substrate is selected from the group consisting of glass, ceramic, wood, plastic, paper, fabric, textile, metals, plain paper, and coated paper.

15. The sensor of claim 10 wherein the detecting material comprises a photoacid generator or a photobase generator in conjunction with an acid-base indicator.

* * * * *